United States Patent [19]

Stine

[11] Patent Number: 4,691,782

[45] Date of Patent: Sep. 8, 1987

[54] METHODS FOR IMPACT AND VIBRATION DAMPING AND ARTICLES THEREFOR

[75] Inventor: Clifford R. Stine, Setauket, N.Y.

[73] Assignee: Radiation Dynamics, Inc., Melville, N.Y.

[21] Appl. No.: 680,190

[22] Filed: Dec. 10, 1984

Related U.S. Application Data

[63] Continuation-in-part of Ser. No. 564,218, Dec. 22, 1983, abandoned.

[51] Int. Cl.[4] .................. A01L 7/02; A43B 13/12; A43B 13/40; F16M 13/00
[52] U.S. Cl. ........................... 168/12; 36/28; 168/28; 248/562; 248/608; 248/636; 522/112; 525/232; 525/236
[58] Field of Search ............... 204/159.11; 525/232, 525/236; 248/562, 636, 608; 428/461, 476.3; 168/12, 13, 14, 28; 522/112; 36/28, 29, 30 R

[56] References Cited

U.S. PATENT DOCUMENTS

| | | | |
|---|---|---|---|
| 1,747,850 | 2/1930 | Tweed | 168/28 |
| 1,889,856 | 12/1932 | Fruin | 168/14 |
| 1,911,187 | 5/1933 | Gray | 168/14 |
| 2,105,242 | 1/1938 | Gray | 168/14 |
| 3,200,885 | 8/1965 | Johnson | 168/12 |
| 3,271,188 | 9/1966 | Albert et al. | 428/463 |
| 3,513,915 | 5/1970 | Sherman | 168/4 |
| 3,547,756 | 12/1970 | Oberst | 428/213 |
| 3,603,402 | 9/1971 | McDonnell | 168/4 |
| 3,605,953 | 9/1971 | Caldwell et al. | 188/268 |
| 3,628,608 | 12/1971 | Sherman | 119/15 |
| 3,747,684 | 7/1973 | Wallen | 168/28 |
| 4,257,465 | 3/1981 | Berg | 411/147 |
| 4,264,490 | 4/1981 | Berejka | 524/291 |
| 4,427,225 | 1/1984 | Bauer et al. | 293/132 |
| 4,429,068 | 1/1984 | Nakahira | 523/453 |

OTHER PUBLICATIONS

Equi-Step Horse Shoe Pad, Brochure Excerpts from "Kompass", a United Kingdom trade directory.
Unitex, Ltd., brochure for Ulon Hoof Pads B & H Manufacturing Inc., "Soft Tops", brochure.
Sorborthane, Inc., Pad Application Instructional Brochure There's No Biz Like Shoe Biz, 32 Equus 39, Gene Freeze.
Norsorex Catalog published in Mar. of 1984 by CDF Chimie.

Primary Examiner—Allan M. Lieberman
Attorney, Agent, or Firm—Hall, Myers & Rose

[57] ABSTRACT

This invention relates to a method of and devices for impact and vibration damping and, more particularly, to devices composed of an elastoplastic material including the characteristics of damping, heat and pressure dimensional stability, and moisture non absorbency of a blend of polyolefin and conjugated diene butyl rubber which converts impact shock or vibration energy into thermal energy.

18 Claims, 4 Drawing Figures

METHODS FOR IMPACT AND VIBRATION DAMPING AND ARTICLES THEREFOR

This is a continuation-in-part of application Ser. No. 564,218, filed Dec. 22, 1983 and now abandoned.

FIELD OF INVENTION

This invention relates to impact shock and vibration damping and, more particularly, to pads or inserts composed of a material possessing the characteristics of dimensional compression stability, shock absorption, dynamic damping by conversion of impact energy to thermal energy and non-moisture absorbency exhibited by blends of conjugated diene butyl rubber and a polyolefin.

BACKGROUND OF THE INVENTION

Many materials and devices such as leather and metal springs have long been employed to ameliorate the effect of impact shock and vibration on otherwise contiguous objects. The principal of shock absorption is to mitigate deleterious effects by distributing, both in time and space, the forces generated by shock impact and vibration. Negative effects of such forces on impacting objects include excessive wear, by frictional contact, deformation, destruction, etc. Primarily, a conventional shock absorbing article, such as an elastomeric pad, will disperse the forces over a broader surface area and extend the time over which the force is applied to the protected article. Although adequate for many purposes, such dispersal may well prove inadequate in particular situations.

For example, in the farriery art, the benefit of shock absorption from a horseshoe pad has long been recognized. In particular, placing a pad between a horseshoe and the hoof serves to reduce frictional contact as well as to mitigate the effect of shock on the horse's hoof and leg thereby lessening the need for veterinary care and painkilling drugs. Leather pads have long been used for this purpose. However, leather, when employed as horseshoe pads, is disadvantaged because it is not dimensionally stable under compressive stress and therefore loosens rather quickly. Furthermore, leather absorbs liquids which in the environment of a stall primarily means water and urine; a severe disadvantage.

To overcome the problems associated with the use of leather or cloth pads, synthetic polymeric pads were introduced to the farriery art. Wallen, in U.S. Pat. No. 3,747,684, defines certain of the shortcomings associated with leather, felt and rubber horseshoe pads. More specifically, Wallen, recites the lack of rigidity and wear resistance associated with pads made from these materials. He suggested shock absorbing pads composed of hard polyurethanes (Shore A Hardness 77–87). However, Wallen notes the heat instability of such pads and a five week storage requirement for permitting sufficient polymerization and, therefore, strength to his pads. McDonald in U.S. Pat. No. 3,603,402 discloses a high impact resistant polymer horseshoe pad composed of polycarbonates. U.S. Pat. No. 3,628,608 issued to Sherman, teaches an elastomeric horseshoe pad incorporating dispersed metal particles for shock absorption. Sherman recognizes the durability requirements of horseshoe pads and as a result includes the particles to enhance structural stability and wearability.

The conventional resilient materials used for construction of horseshoe pads discussed above, like conventional shock absorbers, merely redistribute shock impact force in both time and space. The use of rubbery pads presents an additional consideration; "springiness" exhibited upon shock impact. Such rebounding properties may actually amplify the effects of shock impact because of the tendency to generate an oppositely disposed reaction force. An ideal illustration of this type of behavior is the rebounding capacity of a "live" tennis ball in contrast to a "dead" ball. In the context of a shock absorbing pad, such rebounding is often undesirable.

It is desirable to incorporate shock absorption features in devices relating to other activities. In the case of athletics, trauma may be sustained as a result of impacts with hard surfaces; hence the development of a multitude of pads and protective coverings. More particularly, persons involved with the care of athletes have observed that tremendous impact forces are sustained by the legs, knees and the spinal cord from running. Repeated impacts associated with running can lead to deterioration of the skeletal and cartilaginous tissues. Attempts to solve this problem have led to the adoption of manufacturing practices and materials to minimize trauma. For example, shoe soles are now constructed of laminated resilient shock absorbing materials, each laminate having different time and space shock-redistribution characteristics, to enhance shock absorption. Additional protective features include wider shoe soles for distributing the impact shock across a larger area and longer time; and, therefore, reducing the pressure area loading and rate of application of force on the foot and the body.

Shock absorbing devices often find use in other environments involving a human interface associated with impact forces. The operation of pneumatic hammers and similar tools is based on impact forces. Accordingly, mere redistribution of shock forces from continuously repeated impacts, serves little protection for the operator or, for that matter, the non-impacting tool components.

The various devices discussed above, as well as others dedicated to shock absorption, share the ability to redistribute shock and vibration forces but fail to provide a means for actually damping the energy underlying the forces. None of the aforementioned padding devices possess the capacity for shock impact energy conversion to an alternate energy form.

SUMMARY OF THE INVENTION

Therefore, it is an object of this invention to provide a method and articles for dynamically damping impact shock and vibration energy.

It is another object of this invention to provide a method for converting shock energy into thermal energy and dissipating the thermal energy as heat.

Still another object of this invention is to provide a pad constructed of a dynamic shock impact damping material which converts at least some energy from the impact into heat and which has good dimensional stability and is essentially moisture non-absorbent.

It is another object of this invention to provide a method and a resilient pad for placement between two rigid members where shock impact energy is redistributed in time and space with a minimum of rebounding as well as converting and dissipating significant energy as heat.

Still another object of this invention is to provide a dimensionally stable horseshoe pad for disposition between a hoof and a horseshoe and is composed of a material which converts shock impact energy into thermal energy and subsequently dissipated as heat.

Yet another object of this invention is to provide a resilient, shock and vibration damping pad used in athletic footwear Among other objects of this invention is to provide resilient and rugged shock impact and vibration damping components for use in vehicles and tools where such use would prove beneficial.

This invention includes articles from and uses of a class of a certain type of material. Such materials can be defined as "elastoplastics". Elastoplastics have been discovered to possess remarkable shock impact and vibration energy absorption and dissipation characteristics. Elastoplastics contemplated for this invention, in contrast to conventional rubbery materials, are not "springy", thereby demonstrating the rebounding charcteristics of the above-noted "dead" tennis ball. Additionally, the elastoplastics have been found to possess outstanding physical properties, immediately upon fabrication, thereby permitting immediate use in rugged environments, as for example, that of a horseshoe pad. Pads fabricated in accordance with this invention retain dimensional stability even under severe compressive stress, have minimal rebounding characteristics, are essentially mositure nonabsorbent, possess dimensional heat-stability and convert shock impact or vibration energy into thermal energy which is dissipated as heat. More particularly, the invention comprises use of articles from a material possessing vibration and shock impact damping characteristics similar to those exhibited by an irradiated blend including a $C_2$-$C_3$ polyolefin or substituted $C_2$-$C_3$ polymer and a conjugated diene butyl rubber.

DETAILED DESCRIPTION OF THE PREFERRED EMBODIMENT

Figure 1:
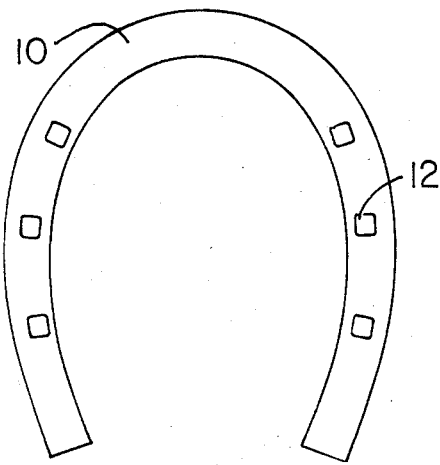
FIG. 1 illustrates a preferred embodiment of the invention in the form of a horseshoe pad.

The articles and methods of use therefor contemplated by this invention will be exposed to a broad range of environments. The most rigorous environment presently contemplated is that of the horseshoe pad. The discussion below, therefore, focuses on this use, not for the purpose of limitation, but rather as illustration.

In order to provide a dynamic shock-impact damping, structurally sound, horseshoe pad capable of surviving the harsh environment generally associated with horses, i.e. the stall and running, a unique material is required. It has now been discovered that a multiply unsaturated resin such as conjugated diene butyl (CDB) rubber alone or in combination with EPDM (ethylene proplylene diene monomer) rubber or polynorbornene when blended with small chain, $C_2$-$C_3$ cross-linkable polymers provide such a material.

The blended material may be characterized as an "elastoplastic" because it exhibits properties of both conventional elastomeric resins and conventional thermoplastic materials. Among the desirable properties the elastoplastics contemplated by this invention possess are dimensional stability under extreme compression stresses, moisture non-absorbency, dimensional heat stability, and dynamic shock impact damping by conversion of impact energy into heat energy. Such characteristics indicate an ideal material for use in the context of a horseshoe pad. The particular material primarily contemplated for use in conjunction with the preferred embodiment of this invention is an irradiated blend of conjugated diene butyl rubber and linear low density polyethylene claimed in U.S. Pat. No. 4,264,490, issued to Anthony Berejka, the subject matter of which is incorporated herein by reference.

The conjugated diene butyl polymer (hereinafter CDB) contemplated for use in the blend incorporation in the method of this invention includes either a single polymer or mixture of two or more such polymers such as those comprised of a copolymer of an isoolefin having from four to seven carbon atoms and a conjugated $C_4$-$C_{14}$ diene and more preferably isobutylene and a conjugated $C_5$ diene. Accordingly, the compositions disclosed and claimed in U.S. Pat. Nos. 3,968,185; 3,616,371; and 3,775,387, as well as those discussed in Baldwin et al, "Graft Curing with Modified Butyl Rubber." *Chemistry and Properties of Crosslinked Polymers*, 1977, Academic Press, Inc., pg. 273-278, and "Conjugated Diene Butyl", *New Products Technical Information*, June 1976, Exxon Division, Linden, N.J., are practiced in the formulation employed in this invention, and therefore, are incorporated herein by reference.

Basically, the CDB formulations include 85 to 95.5% of a $C_4$-$C_7$ isoolefin and 15-0.5% by weight of a $C_4$-$C_{14}$ conjugated diolefin giving a copolymer having a molecular weight from about 5,000 to 500,000.

Of primary interest to the practice of this invention are those CDB polymers having an unsaturated hydrocarbon backbone including isobutylene and the conjugated diene depicted as:

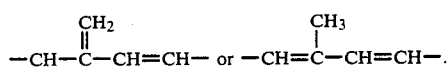

Preferably the conjugated diene is present in less than 5 mole percent and still more preferably in 1-2 mole percent. The resulting polymer is represented generally by the structure:

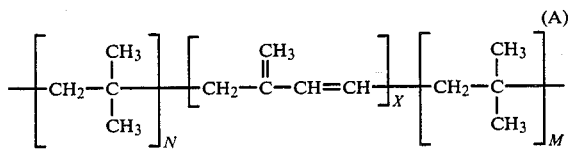

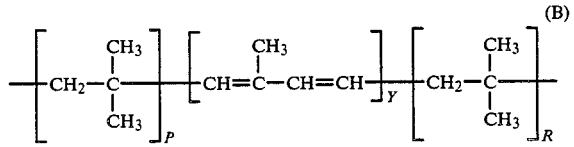

or mixtures of (A) and (B); wherein N, M, P and R are of a sufficient finite number and total so that the conjugated diene falls within the above ranges.

EPDM (Ethylene Propylene Diene Monomer) rubber, other resinous materials having an unsaturated polymeric backbone, also demonstrate somewhat similar, albeit less effective, vibration damping properties when blended with the $C_2$-$C_3$ polyolefins. Where pads are manufactured of a material incorporating EPDM or polynorbornene with CDB, a measurable loss of desirable physical characteristic results. On the other hand, a degree of the dynamic vibration damping characteristics, moisture nonabsorbency and structural integrity of the CDB based elastoplastics are present in EPDM and polynorbornene formulations and thus are considered to be alternate embodiments of this invention.

The $C_2$-$C_3$ olefinic polymers contemplated for use with this invention are best categorized as being resistant to degradation upon exposure to ionizing radiation. When blended with CDB and subsequently irradiated, a pad composed of more easily degraded material (greater than $C_3$) exhibits greater heat distortion from conversion of shock impact energy to thermal energy. Degradation increases correspondingly with increasing monomer length resulting from chain scission due to irradiation. Although capable of practice within the scope of this invention, polybutylenes, and other larger polyolefinic compounds result in a loss of compression strength and therefore are less desirable. Further as a result of injection molding, a CDB/polybutylene pad developed a significant cracking problem. When bent heel to toe, the pad cracked which is undesirable. Smaller carbon chain length polymers, and especially $C_2$ based (ethylene) polymers and blends have been found not only to be more resistant to problems such as degradation, and heat distortion, but also crosslink upon exposure to ionizing radiation thereby enhancing their strength. The degree of degradation is noticably greater in polypropylene and far more pronounced in polybutylene. Accordingly, polyethylene, or substituted $C_2$ containing polymers such as ethylene vinyl acetate are preferred.

Surprisingly, it has been discovered that performance characteristics of the horseshoe pads are enhanced with blends of low density and particularly linear low density polyethylene (0.91) rather than high density polyethylene. Blends including linear low density polyethylene demonstrate substantially equal hardness and damping but pose measurably increased resistance to compression creep and compression set. A possible explanation for the enhanced performance is that the blends including linear low density polyethylene exhibit little if any anisotropy in contrast to high ansiotropy associated with denser and larger olefin polymers.

Therefore, the most preferred constituents for the elastoplastics for use in this invention are blends of linear low density polyethylene thermoplastics and conjugated diene butyl elastomers.

Further observations are now noted relating to the physical characteristics of the elastoplastics and their relationship to the constituent percentages. First, the hardness (or softness) of the thermoplastic component governs the hardness of the final product. Secondly, the greater the amount of CDB in the formulation, the greater the damping. Lastly, the greater the degree of substitution for CDB of, say, EPDM or polynorbornene, certain desirable characteristics are lessened in the ultimate product.

Turning now to a brief summary of the processing, the blends for use in the articles and methods recited herein may be modified in accordance with the Berejka patents to impart varying but specifically desired characteristics to the fabricated pads.

The elastomer, thermoplastic and various modifiers, are blended in conventional apparatus and comminuted. The comminuted material is then extruded, molded or otherwise conventionally processed. Exposing the elastoplastic to high energy ionizing radiation contributes markedly to the desired properties of the pad. Preferably, an electron beam source such as a "Dynamitron" ® manufactured by Radiation Dynamics, Inc., the assignee of this invention, is used to subject the elastoplastic to an electron beam dosage from 2 to 15 Mrads and preferably 8 Mrads. Such exposure enhances the strength and durability of the elastoplastic without seriously affecting its percentage compression set or damping capacity. The increase in "toughness" is attributable to the absorption of electrons by the material. It has been observed, however, relative to irradiation techniques, that higher dosages may lead to a reduction of certain of the desirable properties of the elastoplastics. One final note on such exposure, is that the elastoplastic may be bombarded either before or after fabrication and still impart the desired properties.

Generally, the formulation of the blends described below involved first charging a banbury mixer with the elastomer component at a temperature of between 65°–104° C. (150°–220° F.) and then adding the remaining components. The materials are thoroughly melt-mixed and fluxed at an approximate temperature of 121°–126° C. (250°–260° F.) and the blend removed after milling approximately 10 minutes at a batch temperature between 132°–276° C. (270°–350° F.). The blend is pelletized, melted at approximately 232° C. (250° F.) and sheeted. The sheeted material is cut and pressed into pads at a pressure between 50,000–60,000 psi for one to one and a half minutes. More favorable results are obtained when 10,000 psi pressure is applied for 30 seconds and then 50,000–60,000 psi for 1–1½ minutes.

In summary, the preferred embodiment of the invention contemplates blending of linear low density polyethylene with conjugated diene butyl rubber, forming sheets of the blended material, cutting and compression molding the sheets into pads.

The formulations and materials contemplated within the scope of this invention are more clearly set forth in the following examples. In many cases, the examples are accompanied by an evaluation of its performance under various tests. Of course, the examples are provided to illustrate the preferred embodiment of the invention and selected alternatives thereto and are not intended to be limiting.

Turning briefly to the Tables, certain qualitative values generated by analytical testing procedures or the various formulations are presented. Each of the tests conforming to ASTM procedures are so noted in the table and the particular procedure identifed. Two tests, Damping Average Rebound and Compression Creep, are not subject to a specified procedure and, therefore, are described more completely herebelow.

Damping Average Rebound refers to a measurement of the rebounding capacity of a material. The Lupke pendulum was employed to make this determination. The apparatus and methods for evaluating percent energy loss are identified on page 135 of *Rubber Technology*, 2nd Edition, Krieger Publishing Co., Malabar, Fla., (1981). Specifically referring to the procedure, one inch square pads (minimum thickness 0.18 inch), were mounted on an anvil in a non-distorting fashion. The ram is adjusted so that the impacting point almost touches the pad at rest whereupon the scale is adjusted to "0". The point is then moved to "100" on the scale and released. Repeated impaction (four times) allows the pad to reach thermal equilibrium. The fifth release generates the rebound reading. From this reading energy recovery and energy loss of the ram are calculated.

The compression creep was determined by a new procedure. Basically, compression creep is defined as the increases in deformation overtime upon constant force compression. This measurement contrasts with compression set which measures the elastic recovery of the material subsequent to compression. The apparatus employed to conduct the test employs two flat parallel rigid plates, one movable and one stationary, with a material sample located therebetween. The movable plate adapted to accept weights of specific mass for applying a load to the sample. A gauge, registering 0.001 inch increments, is fitted on the apparatus to measure the movement of the movable plate and zeroed. A one-half to one inch square pad having a thickness between 0.06–0.25 inches is centered between the plates (stacking of pads permits greater thickness when desired) at room temperature (23±1° C.) after noting the zero gauge reading and the dimensions of the pad. A slight compressive force, e.g. 5 psi, is applied to the movable plate and a zero time pad thickness reading taken. Then the compressive force is applied in a uniform and complete manner within approximately 10 seconds. At selected time intervals e.g. 1 minute, 12 minutes, 1 hour, 1 day, the gauge reading is recorded. Compressive creep is calculated as a percentage value for the various time intervals by the following formula:

$$\% \text{ Compressive Creep} = \frac{T_o - T_i}{T_o} \times 100$$

where
$T_o$ = initial or zero time thickness
$T_i$ = thickness at particular interval.

|  | Example 1<br>LLDPE 40 parts<br>CDB 60 parts<br>Antioxident 1 part<br>Brown Colorant 2 parts | | Example 2<br>LLDPE 50 parts<br>CDB 50 parts<br>Antioxident 1 part | | Example 3<br>HDPE 40 parts<br>CDB 60 parts | | Example 4<br>Polybutylene 40 parts<br>CDB 60 parts | | Example 5<br>CDB 50 parts<br>EPDM 25 parts<br>LLDPE 25 parts | | Example 6<br>CDB 25 parts<br>EPDM 25 parts<br>LLDPE 50 parts | |
|---|---|---|---|---|---|---|---|---|---|---|---|---|
|  | O Mr | 8 Mr | O Mr | 8 Mr | O Mr | 8 Mr | O Mr | 8 Mr | O Mr | 8 Mr | O Mr | 8 Mr |
| Shore A Hardness (ASTM D2240) |  | 80 | 91 | 96 | 80 | 85 | 55 | 60 | 55 | 61 | 93 | 94 |
| Tensile Strength psi (ASTM D412) | 714 | 630 | 1143 | 590 | 918 | 566 | 533 | 242 | 665 | 888 | 1455 |  |
| 100% Modulus psi | 470 | 570 | 742 | 451 | 588 | 396 | 284 | 206 | 176 | 661 | 730 |  |
| % Elongation (ASTM D412) | 345 | 380 | 510 | 410 | 350 | 260 | 250 | 480 | 560 | 618 | 560 |  |
| Compression Set % (ASTM D-395) | 14.5 | 16 | 16 | 64 | 36 | 67 | 27 | 5 | 7 | 12 | 7 |  |
| Damping Avg. Rebound (Lupke Method) | 43 | 45 | 45 | 40 | 40 | 36 | 35 | 52 | 53 | 54 | 54 |  |
| Compression Creep |  |  |  |  |  |  |  |  |  |  |  |  |
| 4 hrs (psi) | 1500 | 1720 | 2050 | 1275 | 1800 | 1275 | 1575 | 1125 | 1300 | 2050 | 3100 |  |
| 1 day (psi) | 1450 | 1600 | 950 | 1225 | 1750 | 1250 | 15550 | 1075 | 1210 | 2000 | 2900 |  |

|  | Example 7<br>CDB 33 parts<br>EPDM 33 parts<br>LLPDE 33 parts | | Example 8<br>CDB 25 parts<br>EPDM 50 parts<br>LLDPE 25 parts | | Example 9<br>EPDM 50 parts<br>LLDPE 50 parts<br>Antioxident 1 part | | Example 10<br>CDB 50 parts<br>EPDM 50 parts<br>Antioxident 1 part | | Example 11*<br>CDB 60 parts<br>LLDPE 40 parts<br>PNB 20 parts<br>Antioxident 1 part | Example 12*<br>CDB 60 parts<br>LLDPE 40 parts<br>PNB 60 parts<br>Antioxident 1 part |
|---|---|---|---|---|---|---|---|---|---|---|
|  | O Mr | 8 Mr | O Mr | 8 Mr | O Mr | 8 Mr | O Mr | 8 Mr | 8 Mr | 8 Mr |
| Shore A Hardness (ASTM D2240) | 73 | 76 | 56 | 66 | 92 | 94 | 55 | 53 | 74 | 55 |
| Tensile Strength psi (ASTM D412) | 286 | 285 | 90 | 682 | 622 | 1453 | 394 | 452 | 300 | 175 |
| 100% Modulus psi | 244 | 365 | 137 | 240 | 567 | 767 | 143 | 121 | 176 | 110 |
| % Elongation (ASTM D412) | 520 | 490 | 340 | 520 | 550 | 540 | 550 | 520 | 250 | 300 |
| Compression Set % (ASTM D-365) | 45 | 12 | 64 | 7 | 17 | 6 | 41 | 5 | 45 | 58 |
| Damping Aug. Rebound (Lupke Method) | 55 | 55 | 67 | 67 | 59 | 60 | 57 | 57 | 30 | 20 |
| Compression Creep |  |  |  |  |  |  |  |  |  |  |
| 4 hrs (psi) | 1075 | 1525 | 960 | 1300 | 1625 | 3125 | 1100 | 1350 | 900 | 300 |

| -continued | | | | | | | | | | |
|---|---|---|---|---|---|---|---|---|---|---|
| 1 day (psi) | 1025 | 1450 | 920 | 1260 | 1575 | 3000 | 1050 | 1200 | 850 | 110 |

LLPPE - Dow XO-61500.38 linear low density polyethylene; Dow Chemical Company
CDB - CDB-76-4 conjugated diene butyl rubber; Exxon Chemical Company
Antioxident - Irganox 1010; Ciba Giegy Corporation
Brown - Wilson Fiber Fill, 50-BN-3838 - Brown colorant (added prior to molding); Dart and Kraft Company
HDPE - Gulf 9606 High Density Polyethylene; Gulf Oil Chemicals
Polybutylene - Shell Polybutylene 1600; Shell Chemical Co.
EPDM — Ethylene Propylene Diene Monomer
PNB - Norsorex 150AR, a polynorbornene rubber produced by CdF Chimie S.A., France
*The pads evaluated for examples 11 and 12 were approximately one-half as thick as those involved with the prior examples.

FIG. 1 exemplifies one form of horseshoe pad which is inserted and secured between the horseshoe and the hoof. As depicted, pad 10 substantially conforms to the contour of the horseshoe so the frog of the hoof remains exposed. Holes 12 may be employed to facilitate attachment to the hoof by allowing nailing of the shoe to the hoof without resistance from the pad. The pad used for racing is of the form disclosed in FIG. 1. A pad used for training may cover the entire hoof so as to prevent bruising from large stones, etc.

Figure 2:
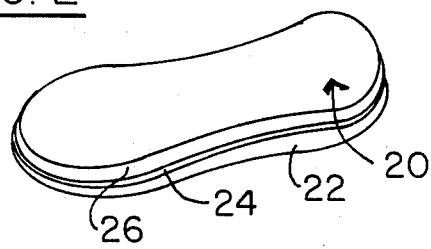
FIG. 2 is a side view of a laminated shoe sole made in accordance with the invention.

In FIG. 2, laminated shoe sole 20 is illustrated. Some of the blends contemplated by the process of the aforesiad patent are not sufficiently abrading resistant and may wear overly rapidly. One approach to the solution of the problem is to surface harden the pad. Specifically if the pad is for instance 3/16 inch thick, 20 mils of each surface may be exposed to a higher radiation dose (via differential radiation governed by penetration) than the interior of the pad to increase wear resistance. Hardening of the blend tends to reduce energy absorption but by hardening only the outer surface, energy absorption of the pad interior is not materially affected.

A second approach to prevent wear resistance of the blends when used in shoes is to employ a laminated sole. Laminated sole 20 provides the benefit of lasting wearability and dynamic damping by incorporating a suitable durable bottom layer 22 made of any conventional material onto which layer 24 of dynamic damping material, contemplated by this invention, is affixed. Layer 26, composed of any conventional material is secured above the damping layer. Layers 22 and 26 may also include additional, known features such as microscopic air pockets to produce a bellows effect to provide maximum shock absorption. One additional matter for consideration is heat generation by layer 24. Due to the heat generated, layer 26 may include heat insulating features to insure the wearer's comfort.

Figure 3:
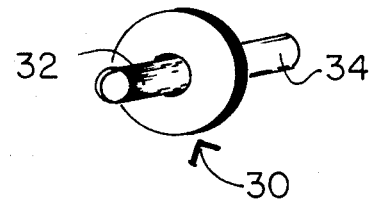
FIG. 3 is a perspective view of a threaded machine member.

FIG. 3 exemplifies yet another form in which the instant polymer blends or a composition having like impact absorption properties, may be employed. specifically, bushing 30 including attachment means 32 and 34, in this case, threaded members to secure it to structural members (not shown).

Figure 4:
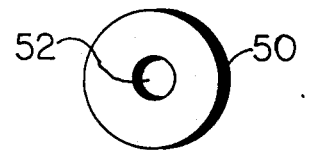
FIG. 4 is a perspective view of a bushing made in accordance with this invention.

FIG. 4 depicts washer 50 of a shock absorption material of the invention which includes hole 52 for inserting onto a structural member (not shown).

Materials possessing dynamic damping characteristics may be employed for many purposes and in many forms. The examples disclosed herein are intended to illustrate some of the preferred embodiments of the instant invention. Other vairations and modifications should now be apparent to the skilled artisan given this disclosure. Accordingly, such variations and modifications are deemed to fall within the intent of this invention as defined by the following claims:

I claim:

1. A method for dynamic force damping including the steps of
   (a) affixing to one object a pad comprising a material having the damping, energy abosorption, dimensional stability and liquid absorption characteristics of an elastoplastic blend including:
      (1) 25-50 parts of a first polymer prepared from a monomer selected from the group consisting of olefin, substituted olefin, and unsaturated vinyl acetate monomers, and
      (2) 25-80 parts of conjugated diene butyl rubbery material;
   (b) subjecting the object to impact or vibrating force relative to a second object whereby significant energy is dissipated as heat in the pad.
2. A method according to claim 1 further including the step of exposing the elastoplastic blend to high energy irradiation.
3. A method according to claim 1 where the first polymer is resistant to degradation upon exposure to high energy irradiation.
4. A method according to claim 3 where the elastoplastic blend exhibits minimal anisotropy.
5. A method according to claim 4 where the first polymer is a $C_2$-$C_3$ polyolefin.
6. A method according to claim 3 wherein said elastomeric blend includes 25-50 parts of the first polymer and 50-75 parts of a of conjugated diene butyl rubber or a blend of conjugated butyl rubber and a terpolymer rubber prepared from ethylene, propylene and diene monomers.
7. A method according to claim 3 where said first polymer is saturated.
8. A method according to claim 7 where the rubbery material includes polynorbornene.
9. A method according to claim 7 including the step of blending between 30-70 parts of the rubbery material with 30-70 parts of the first polymer.
10. A method according to claim 9 where 40-60 parts of the polymer is blended with 40-60 parts of the rubbery material.
11. A method according to claim 6 where the first polymer is linear low density polyethylene.
12. A method according to claim 7 where the rubbery material comprises conjugated diene butyl rubber and the first polymer is linear, low density polyethylene.
13. A method according to claim 1 further including affixing said pad to a second object.
14. A method according to claim 13 wherein said pad is in the shape of a horseshoe, said one object is a horseshoe and said second object is a hoof.
15. A method according to claim 1 wherein said pad is in the form of a shoe sole and wherein said one object is a durable, wearable bottom layer in the form of a shoe sole.
16. A method according to claim 1 wherein said pad is in the form of a bushing.

17. A method to convert shock energy into thermal energy comprising the steps of
    (a) formulating a blend of 30-70 parts of a rubbery material including conjugated diene butyl rubber and 30-70 parts of a polyolefin,
    (b) fabricating the blend into a desired article,
    (c) placing the article between a first and a second object wherein the presence of shock energy, at least some of the energy is converted to thermal energy and dissipated as heat.

18. In combination,
    (a) a horseshoe,
    (b) a pad comprising a blend of 30-70 parts polyolefin and 25-60 parts conjugated diene butyl rubbery material said pad being essentially moisture non absorbent, dimensionally stable and capable of dynamic shock damping by converting a measurable amount of shock impact energy into heat, and
    (c) means to permit affixing said horseshoe to a horse with said pad disposed therebetween.

* * * * *